United States Patent [19]
Schlüter

[11] Patent Number: 5,483,866
[45] Date of Patent: Jan. 16, 1996

[54] PNEUMATIC BOOSTER WITH SOLENOID AUXILIARY CONTROL, PARTICULARLY FOR MOTOR VEHICLE BRAKE SYSTEMS

[75] Inventor: Peter Schlüter, Kammerforst, Germany

[73] Assignee: Lucas Industries Public Limited Company, Solihull, United Kingdom

[21] Appl. No.: 383,202

[22] Filed: Feb. 3, 1995

[30] Foreign Application Priority Data

Feb. 17, 1994 [DE] Germany .......................... 44 05 076.3

[51] Int. Cl.$^6$ .................................................. F15B 13/16
[52] U.S. Cl. ............................................. 91/367; 91/376 R
[58] Field of Search .................................... 91/367, 369.2, 91/369.1, 376 R

[56] References Cited

U.S. PATENT DOCUMENTS 5,172,964  12/1992  Levrai et al. .......................... 91/376 R

FOREIGN PATENT DOCUMENTS

0478396A1  4/1992  European Pat. Off. .
4211849A1  10/1993  Germany .
1339669A1  4/1992  Japan ..................................... 91/376 R Primary Examiner—F. Daniel Lopez
Attorney, Agent, or Firm—Oblon, Spivak, McClelland, Maier & Neustadt

[57] ABSTRACT

In a booster housing (10) two chambers (12, 14) separated from each other by a movable wall (16) are connectable to each other by a control valve (20) having a valve body (22) axially movable in common with the wall (16), said valve body having a first valve seat (24), a sealing element (60) axially movable in said valve body and pretensioned in the direction of said first valve seat and a valve barrel (30). The valve barrel (30) has a second valve seat (32) and is pretensioned in the direction of the sealing element (60), is couplingly connected for movement by means of a piston (42) movable by an actuator element (44) in the direction away from the sealing element (60) and is movable by means of a solenoid (40) also independently of the piston (42). On the piston (42) a third valve seat (72) is formed spaced apart from the sealing element (60) by a distance (B) when valve barrel (30) and piston (42) are in rest position, but is in contact with the sealing element (60), thus preventing the inflow of air into the first chamber (12), when the actuator element (44) is released whilst the valve barrel (30) is maintained by the solenoid (40) in a position distant from the sealing element (60).

3 Claims, 2 Drawing Sheets

PNEUMATIC BOOSTER WITH SOLENOID AUXILIARY CONTROL, PARTICULARLY FOR MOTOR VEHICLE BRAKE SYSTEMS

TECHNICAL FILED

The present invention relates to a pneumatic booster with solenoid auxiliary control, particularly for motor vehicle brake systems according to the preamable of claim 1.

BACKGROUND OF THE INVENTION

In a known brake booster of the kind specified (DE-A 4211849) the piston is configured exclusively to transfer actuating forces and to mechanically control the valve barrel. The stopper element is secured to the piston and extends outwardly through radial recesses of the valve barrel and valve body in alignment with each other where it coacts with a stopper formed on the booster housing. The recess of the valve barrel is dimensioned so that its resting position is dictated by the valve barrel being in direct contact with the stopper element. The seal interposed between valve barrel and piston is a lip-type seal held in an annular groove of the piston and, irrespective of the position of the valve barrel with respect to the piston, is in sealing contact with a cylindrical inner wall of the valve barrel.

In this known assembly the valve barrel may be solenoid actuated to support the wanted braking effort of the driver produced by mechanical force input via the actuator element, when a sensor arranged for example on the actuator element senses that a certain actuating rate is exceeded which is interpreted as being a sign that the driver intends to initiate braking action in an emergency. Should the driver subsequently recognize that instead of emergency braking, normal braking is sufficient, he will reduce the pressure exterted on the brake pedal and thus trigger actions in the brake booster which may be solenoid monitored and taken as an indication to de-energize the solenoid and thus allow the valve barrel to return to its rest position. However, electronically monitoring the components within the booster is a problem, because it is difficult to accommodate the wiring needed for this so as not to become a nuisance whilst being liable to malfunction itself.

The invention is thus based on the object of providing simple means less liable to malfunction for discontinuing solenoid-triggered boosting of braking action in an emergency.

This object is achieved according to the invention by the features of claim 1.

SUMMARY OF THE INVENTION

The invention enables the driver to discontinue braking action initiated by him in an emergency at any time by purely mechanical means even if the solenoid is still energized, as a result of which the valve barrel is still unable to return to its rest position. In this case the piston provisionally takes on the task, by means of its third valve seat, of preventing the further inflow of air into the first chamber and to cause the pressure to be equalized between the chambers.

Advantageous aspects of the invention are the subject matter of the subclaims.

BRIEF DESCRIPTION OF THE DRAWINGS

An example embodiment of the invention will now be explained in the following with reference to the schematic drawings showing further details, in which.

DETAILED DESCRIPTION

Figure 1:
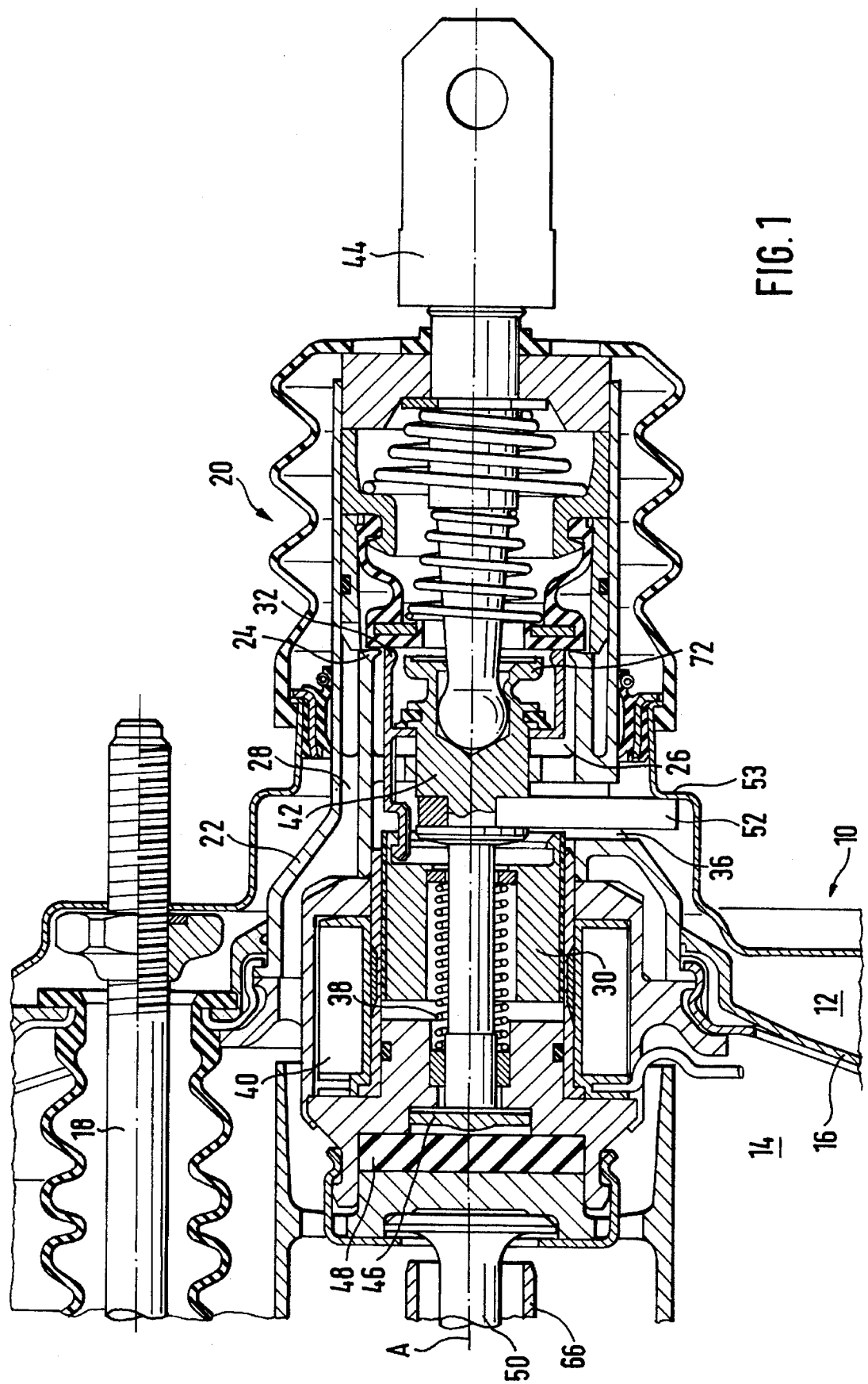
FIG. 1. is an axial section through the rear part of a pneumatic brake booster with solenoid auxiliary control

The illustrated brake booster is substantially rotationally syymmetrical with reference to an axis A which normally agrees with the longitudinal direction of the vehicle when installed in a motor vehicle. The brake booster has a booster housing 10 in which a first chamber 12 and a second chamber 14 are separated from each other by a movable wall 16. The booster housing 10 is held together by a parallel-axis arrangement of tension rods, of which only one is illustrated.

Associated with the brake booster is a control valve 20 which is incorporated in the main in the booster housing 10 and has with reference thereto an axially movable valve body 22. In the interior of the valve body 22 an annular first valve seat 24 is formed which separates a passage 26 merging into the rear chamber 12 from a passage 28 merging into the front chamber 14. The valve body 22 has further an axial bore in which a sleeve-shaped valve barrel 30 is slidingly guided along the axis A. The valve barrel 30 is composed of front and rear components which are latched together. At the rear end of the rear component (shown on the right in the drawing) of the valve barrel 30 a second valve seat 32 is formed concentric to the first valve seat 24.

Spaced upstream from the second valve seat 32 (shown on the left in the drawing) the valve barrel 30 has a radial recess 34 which joins another radial recess 36 configured wider, however, in the axial direction in the valve body 22. The valve barrel 30 is permanently urged to the rear (to the right in FIGS. 1 and 2) by an axially preloaded valve spring 38. In the control valve 20 a solenoid 40 is incorporated which is assigned to the left-hand component of the valve barrel 30 as the solenoid armature such that the valve barrel 30 is drawn forwards against the resistance of the valve spring 38 when the solenoid 40 is energized.

In the valve body 22 a piston 42 is guided which at its rear end is connected to a rod-shaped actuating element 44 and having at its front end a piston head 46. The latter forms together with a rubber element 48 embedded in the valve body 22 and a booster output member 50 arranged in front thereof, a mechanical force translation means of the usual kind in brake boosters.

In an annual groove of the piston 42 a stopper element 52 is latched in such a way that it is connected to the piston for common axial movement. The stopper element 52 extends radially outwards through the recesses 34 and 36 in the valve barrel 30 and valve body 22 respectively and in the illustrated rest position of the piston 42 is in contact with a stopper 53 which is formed on a shoulder of the booster housing 10 and is thus independent of the position of the valve body 22. Spaced away from the rear of the stopper element 52 a flange-like coupling element 54 is formed which in the illustrated rest position of the piston 42 and of the valve barrel 30 is in contact with an annular abutment 55 formed on the valve barrel.

Assigned to the abutment 55 of the valve barrel 30 is an annular lip-type seal 56 located in an annular recess formed open radially outwards in the piston 42 and which in the illustrated rest position provides an end seal of the abutment 55. The effective diameter of the seal 56 is slightly smaller than the effective diameter of the second valve seat 32. The region downstream of the seal 56 (on the right in the drawing) is continuously exposed to atmospheric pressure.

In the illustrated rest position of the valve barrel 30 the seal 56 prevents the atmosphere from gaining access to the rear chamber 12 via the valve barrel 30 and the recesses 34 and 36.

By means of a rear return spring 58 the actuator element 44 is normally maintained in its illustrated rest position in which an annular sealing element 60 disposed within the valve body 22 in the usual way and pretensioned forwardly by a spring 62 has sealing contact with the first valve seat 24, whilst not providing a total seal of the second valve seat 32, a slight difference in pressure existing between the two chambers 12 and 14. The rear component of the valve barrel 30 having the second valve seat 32 is connected to the front component of the valve barrel by spring latching fingers 70. On the rear side of the piston 42 a third annular valve seat 72 is formed, the effective diameter of which is slightly smaller than that of seal 56. In the illustrated rest position the third valve seat is spaced away from the sealing element 60 by a distance B.

In operation the front chamber 14 is permanently connected to a vacuum source. The moving wall 16 and the valve body 2 2 connected thereto in common axial movement thereof are urged into their rear final position, as shown, by a front return spring 64.

In idle condition the stopper element 52 is in contact with the stop 53, thereby defining the rest position of the piston 42. The valve barrel 30 is supported by the coupling member 54 with practically all of the force exerted by the valve spring 38 clamped between the valve barrel and the piston 42, thereby also defining the rest position of the valve barrel 30, the second valve seat 32 being maintained in contact with the sealing element 60 by a slight residual force of the valve spring 38.

Figure 2:
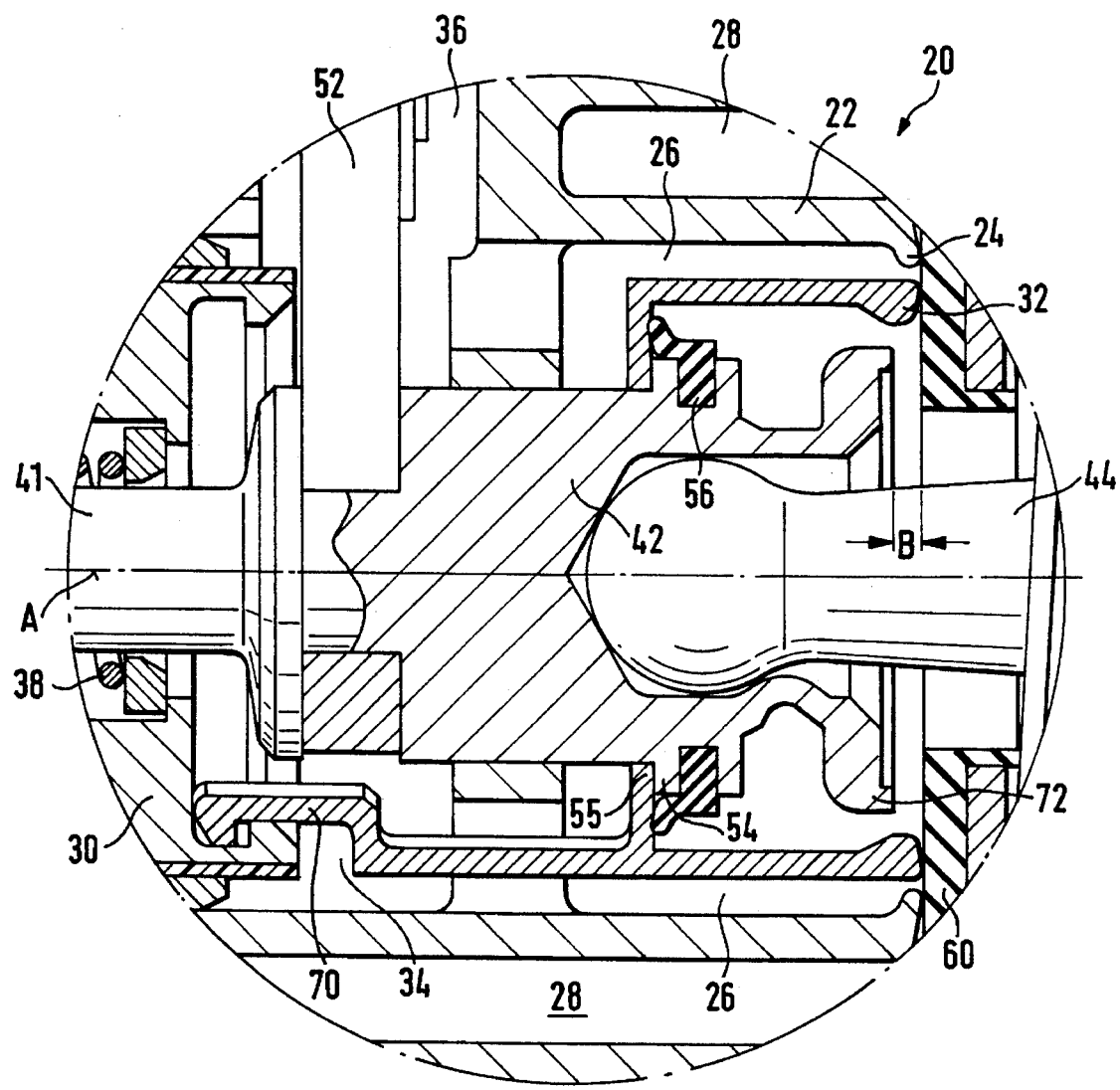
FIG. 2 is an enlarged partial view of FIG. 1.

On forward displacement of the actuator element 44, which for instance is connected to the brake pedal of a vehicle, thus producing forward displacement of the piston 42, the coupling member 54 thereof includes displacement of the abutment 55 and thus of the valve barrel 30 as a whole so that its valve seat 32 is released from the sealing element 60, allowing the downstream flow of atmosphere into the valve body 22 to access the rear chamber 12 through the passage 26 and further through the radial recess 36 in the valve body 22. The front chamber 14 is separated from the rear chamber 12, since the sealing element 60 is maintained firmly in contact with the first valve seat 24, thereby resulting in a difference in pressure between the two chambers 12 and 14 which causes the movable wall 16 together with the valve body 22 and the booster output member 50 to be displaced forwardly. The booster output member 50 transfers the force acting on it to a brake master cylinder 66, the rear end area of which is illustrated in FIG. 1.

If the forward movement of the valve barrel 30, affected mechanically via the piston 42, and the attendant booster output to the brake master cylinder 66 need to be accelerated and amplified, the solenoid 40 is energized so that it draws the valve barrel 30 away from the coupling element 54 forwards, thereby increasing the clear flow cross-section between the second valve seat 32 and the sealing element 60. Such a boosted output of the brake booster may for instance be desirable when the vehicle being decelerated is heavily loaded or when particularly fast forward movement of the actuator element 44 indicates that braking action is wanted on an emergency.

In these instances the solenoid 40 receives current via a controller with which an acceleration sensor monitoring the actuator element 44 is associated.

On de-energization of the solenoid 40 the valve barrel 30 is again urged rearwards by the valve spring 38 so that the abutment 55 is returned in contact with the coupling element 54 and the seal 56 is again effective. On completion of a mechanical force input via the actuator element 44 the piston 42 together with the valve barrel 30 returns to the rest position. The movable wall 16 and the valve body 22 fail to be involved in this return movement as long as a difference in pressure exists between the chambers 12 and 14o This difference in pressure is depleted by the valve barrel 30 coming into contact with the sealing element 60 by its second valve seat, resulting in the rear chamber 12 being isolated from atmosphere and the sealing element being subsequently urged a short distance to the rear so that it unseats from the first valve seat 24.

If, following a mechanically initiated and solenoid-supported actuation of the brake booster, the actuator element 44 is withdrawn, whilst the solenoid 42 is still energized, the third valve seat 72 comes into contact with the sealing element 60, it then being the one to isolate the rear chamber 12 from atmosphere. The force of the return spring 58 causes the piston 42 to urge the sealing element 60 by its third valve seat 72 sufficiently to the rear so that it uncovers the first valve seat 24. As a result of this, pressure equalization occurs between the chambers 12 and 14 so that the movable wall 16 together with the valve body 22 return to the rest position as shown.

What is claimed is:

1. A pneumatic booster with solenoid auxiliary control, particularly for motor vehicle brake systems, having a booster housing (10) in which at least a first chamber (12) and a second chamber (14) are contained and are separated from each other by a movable wall (16), a valve body (22) which is connected to said movable wall (16) for common axial relative movement with reference to said booster housing (10) and having a first valve seat (24), a sealing element (60)

arranged axially movable in said valve body (22) and pretensioned in the direction of said first valve seat (24), a piston (42) which is movable by means of an actuator element (44) axially away from said sealing element (60), a valve barrel (30) having a second valve seat (32) assigned to said sealing element (60), pretensioned in the direction of said sealing element (60), couplingly connected to said piston (42) for movement in the direction away from said sealing element (60) and also movable in the direction away from sealing element (6) by means of a solenoid (40) independently of said piston (42), a seal (56) between said valve barrel (30) and said piston (42), a stopper element (52) defining a common rest position of said piston (42) and said valve barrel (30) in which said first chamber (12) is sealed off from the inflow of air and is connected to said second chamber (14), and a passage (26) through which air flows into said first chamber (12) when said valve barrel (30) leaves its rest position, said sealing element (60) being in contact with said first valve seat (24) and discontinuing the connection between said two chambers (12, 14), characterized in that on said piston (42) a third valve seat (72) is formed which is spaced away from said sealing element (60) when said valve barrel (30) and said piston (42) are in rest position, but which are in contact with said sealing element (60) to thus prevent the inflow of air in said first chamber (12) when said actuator element (44) is released, whilst said valve barrel (30) is maintained by said solenoid (40) in a position distant from said sealing element (60).

2. The booster as set forth in claim 1, wherein an abutment (55) is disposed on said valve barrel (30) so that, in the rest position of said piston (42), it is in contact with an coupling element (54) thereof and thereby defining the rest position of said valve barrel (30) as a function of that of said piston (42).

3. The booster as set forth in claim 1 or 2, wherein said seal (56) between said valve barrel (30) and said piston (42) is axially effective and disposed so that it has a sealing action when said abutment (55) is at least more or less in contact with said coupling element (54).

* * * * *